Aug. 5, 1969     D. H. ROFE     3,459,444
BELLOWS FLEX JOINT
Filed Jan. 10, 1968

DUANE H. ROFE
INVENTOR.
BY H. M. Saragovitz
E. J. Kelly, H. Berl
and R. M. Lyon
ATTORNEYS

United States Patent Office 3,459,444
Patented Aug. 5, 1969

3,459,444
BELLOWS FLEX JOINT
Duane H. Rofe, Lake Orion Township, Oakland County, Mich., assignor, by mesne assignments, to the United States of America as represented by the Secretary of the Army
Filed Jan. 10, 1968, Ser. No. 696,874
Int. Cl. F16l 27/10, 21/00, 51/02
U.S. Cl. 285—226                                1 Claim

ABSTRACT OF THE DISCLOSURE

A flexible conduit wherein two pipe ends are placed in telescoping relation and a flexible covering joins the pipes for a gas tight seal and wherein the inner pipe is shaped like a ball where it contacts the outer pipe.

---

This invention relates to flexible connectors for conduits, particularly exhaust conduits for internal combustion engines and the like.

It is known to provide a flexible connector for exhaust conduits by providing two pipe sections in telescoping relationship, but of such diameters as to provide a space between the respective pipe walls so that the pipes may move in all directions relative to each other. A flexible covering such as a metal bellows commonly surrounds and connects the pipes to provide a gas tight seal. Such constructions are not satisfactory in many applications because the metal bellows is subjected to severe vibrations transmitted from the spaced apart pipes as well as vibrations caused by the exhaust gas pressure pulses acting on the bellows at its natural frequencies. In vehicles, such as tanks, where engine r.p.m. is varied over a wide range the frequencies of mechanical vibration and exhaust gas pulse vary over a wide range making it difficult to tune the flexible joint to avoid these frequencies.

It is an object of the invention to provide an improved flexible connector for conduits.

More specifically stated, it is an object of the invention to provide an improved flexible connector for conduits such as internal combustion engine exhaust conduits and the like which will be durable and substantial in service, and at the same time will absorb axial and bending motions to which it may be subjected in use, so as not to be distorted or damaged thereby.

It is an additional object of this invention to provide a flexible joint for exhaust gas conduits which will not have a rupture of the flexible covering caused by excessive mechanically induced or gas pulse induced vibrations.

Figure 2:
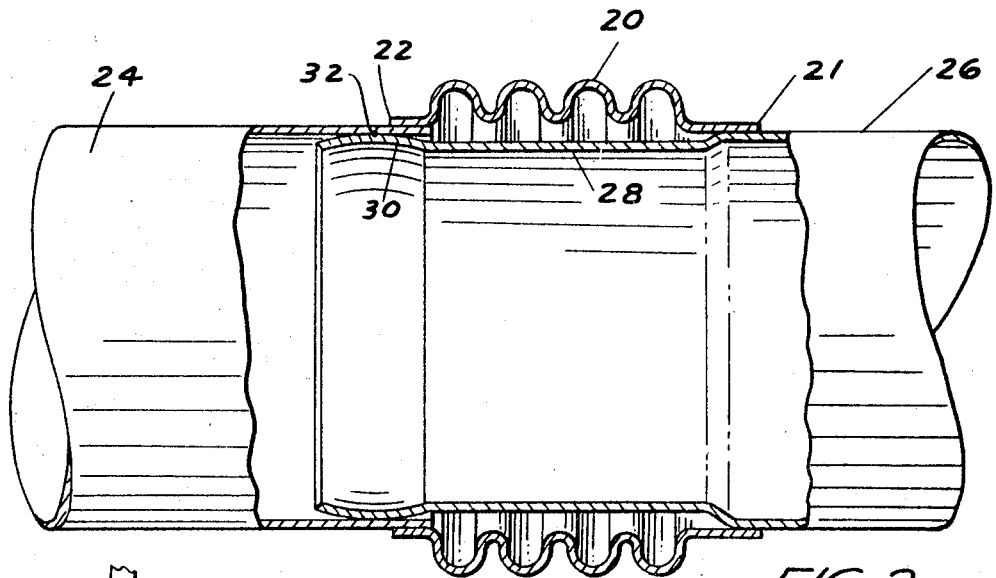
Figure 1:
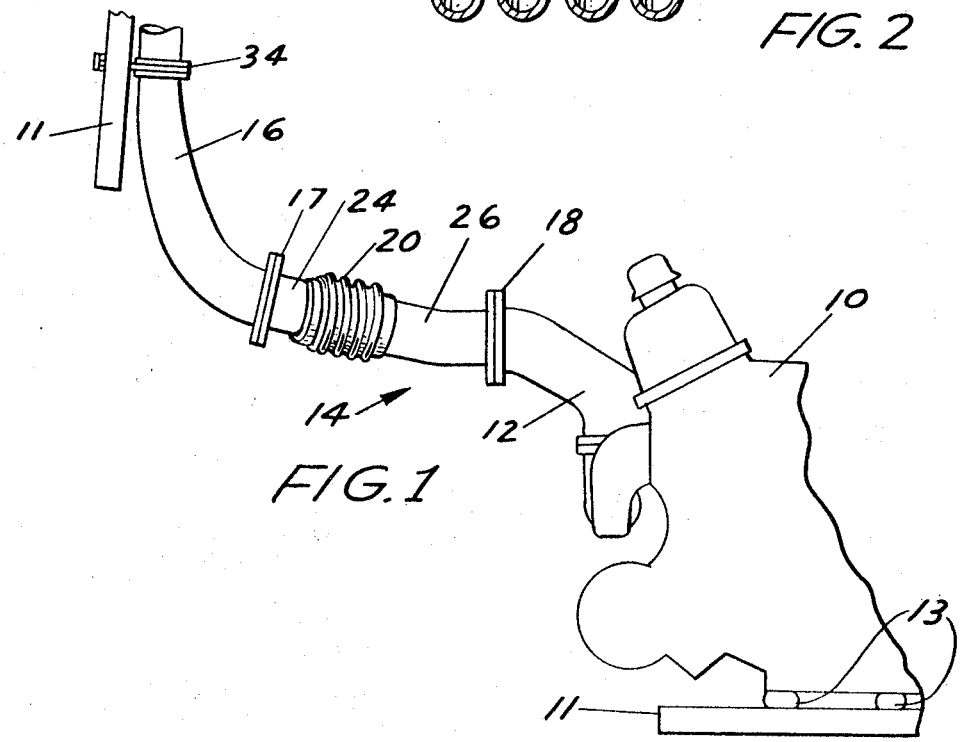

Various other objects, advantages and features of the invention will be apparent from the description and drawings wherein:

FIG. 1 is a partial view of an engine installation embodying a conduit structure according to the invention; and FIG. 2 is a detailed view in longitudinal section of the flexible joint.

Referring now to the drawing, FIG. 1 shows an engine 10 which is springably supported on the chassis 11 in the usual manner as by rubber supports 13. An exhaust manifold 12 conducts the exhaust gasses from the engine to the tail pipe 16 which is rigidly attached to another part of chassis 11 as by clamps 34. Illustrated generally at 14 is the flexible joint secured between exhaust pipe 16 and tail pipe 12 as by bolted flange pairs 17 and 18.

FIG. 2 shows the detail of the flexible part of joint 14. Metal bellows 20 is jointed to pipes 24 and 26 as by welding at 21 and 22. Pipe 26 has a section 28 of reduced diameter to fit loosely into pipe 24. At the end of pipe 26 the reduced section 28 has an arc shaped annular groove 30 extending outwardly. Groove 30 has the general overall shape of the middle section of a hollow ball formed by passing two parallel planes equidistant on each side of the ball's center. In other words, groove 30 has a radius from a single point on the centerline of pipe 26 and that point is the center of curvature of the arc of groove 30. Groove 30 extends outwardly into slidable contacting relation with pipe 24 as at point 32. The ball shape of groove 30 provides a circular line of contact between pipe 24 and groove 30 even when pipes 24 and 26 are tilted relative to each other. Pipe 26 is therefore free to move axially inside of pipe 24 as well as tilt while maintaining the line contact. The end of pipe 26 therefore is maintained in contacting relation with pipe 24 and yet the structure provides that pipes are relatively shiftable within predetermined broad limits.

The novel flexible joint structure disclosed herein is capable of absorbing only axial and bending motions at the flexible joint and tail pipe 16 must normally be capable of cantilever motion to cooperate with the flexible joint. Such cantilever motion is normally provided in tailpipe installations and further explanation is therefore not deemed necessary. When engine 10 rotates or moves on its supports, the pipe 26 acting through groove 30 will move pipe 24 laterally while groove 30 rotates and moves axially in pipe 24.

In the event that there is no movement allowed in tailpipe 16 the new and novel flexible connectors may be placed in series to absorb all motions.

In an installation such as illustrated in FIG. 1 the new and novel flexible connector has operated over 10,000 miles without failure whereas identical constructions without groove 30 to maintain contact between the pipes fail by rupture of the bellows much sooner.

I have disclosed herein a new and novel flexible joint structure for exhaust gas conduits, but it is not my intention to be limited to the exact structure disclosed because many modifications to this exact structure would be readily apparent to those skilled in the art.

I claim:

1. A flexible pipe coupling for use with an engine and a chassis wherein the engine is springably mounted on the chassis comprising: a first pipe having a first portion adapted to be secured to the engine, an intermediate reduced diameter portion, and an outwardly extending arcuate annular end portion having a spherical outer surface; a second pipe being in the shape of an elbow and having a first portion adapted to be fixed to the chassis, a long curved intermediate portion, and an outer portion having a cylindrical internal surface encompassing and contacting said spherical surface of said first pipe; a flexible metallic bellows surrounding said intermediate reduced diameter portion in spaced relationship thereto, means sealingly securing one end of the bellows to the first portion of the first pipe adjacent said intermediate reduced diameter portion, means sealingly securing the other end of the bellows to the outer end portion of the second pipe, said arcuate portion having a center of curvature at a point on the centerline of said first pipe whereby an optimum of flexibility is provided when said first and said second pipes experience angular movement with respect to each other by permitting said center of curvature of said arcuate annular end portion and the point about which said first and said second pipes pivot in undergoing said angular motion to coincide.

References Cited

UNITED STATES PATENTS

| | | | |
|---|---|---|---|
| 2,437,385 | 3/1948 | Halford | 285—227 X |
| 2,470,989 | 5/1949 | Keller et al. | 285—226 X |
| 2,707,117 | 4/1955 | Fentress et al. | 285—226 |
| 2,901,272 | 8/1959 | Andersen | 285—227 |
| 3,173,710 | 3/1965 | Kinnison. | |
| 3,355,190 | 11/1967 | Francis | 285—226 X |

FOREIGN PATENTS 835,378   3/1952   Germany.

THOMAS F. CALLAGHAN, Primary Examiner

U.S. Cl. X.R.

180—64; 285—334